(12) United States Patent
Botkin et al.

(10) Patent No.: US 7,821,940 B2
(45) Date of Patent: Oct. 26, 2010

(54) TRANSMISSION OF MAINTENANCE INFORMATION OF AN ACTIVE PACKET CONNECTION THROUGH EMPLOYMENT OF PACKETS COMMUNICATED OVER THE ACTIVE PACKET CONNECTION

(75) Inventors: Douglas J. Botkin, Aurora, IL (US); Mark G. Bradac, Batavia, IL (US); Edward A. Clark, Sugar Grove, IL (US); Joseph J. Kott, Aurora, IL (US); Steven L. Makowski, Naperville, IL (US); Alan H. Matten, Chicago, IL (US); Douglas W. Sturm, Wheaton, IL (US); Peng Zhang, Buffalo Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 904 days.

(21) Appl. No.: 10/818,331

(22) Filed: Apr. 5, 2004

(65) Prior Publication Data
US 2005/0220028 A1 Oct. 6, 2005

(51) Int. Cl.
*H04L 12/26* (2006.01)
*H04L 12/28* (2006.01)
(52) U.S. Cl. .................. 370/235; 370/252; 370/401
(58) Field of Classification Search .................. 370/235
See application file for complete search history.

(56) References Cited

U.S. PATENT DOCUMENTS

| | | | |
|---|---|---|---|
| 6,590,869 B1 * | 7/2003 | Beyda et al. ................. | 370/248 |
| 6,678,250 B1 * | 1/2004 | Grabelsky et al. ............ | 370/401 |
| 6,741,569 B1 * | 5/2004 | Clark ........................... | 370/252 |
| 6,748,433 B1 * | 6/2004 | Yaakov ........................ | 370/401 |
| 6,914,900 B1 * | 7/2005 | Komatsu et al. ............. | 370/356 |
| 7,092,382 B2 * | 8/2006 | Lucioni ........................ | 370/352 |
| 7,197,010 B1 * | 3/2007 | Berstein et al. .............. | 370/252 |
| 2002/0193999 A1 * | 12/2002 | Keane et al. ................. | 704/270 |
| 2003/0016411 A1 * | 1/2003 | Zhou et al. ................... | 359/110 |
| 2003/0117959 A1 * | 6/2003 | Taranov ....................... | 370/241 |
| 2003/0142651 A1 * | 7/2003 | Matta et al. .................. | 370/338 |
| 2004/0062204 A1 * | 4/2004 | Bearden et al. .............. | 370/250 |
| 2004/0071084 A1 * | 4/2004 | El-Hennawey et al. ...... | 370/230 |
| 2004/0252646 A1 * | 12/2004 | Adhikari et al. .............. | 370/252 |
| 2005/0002400 A1 * | 1/2005 | Karol et al. .................. | 370/394 |
| 2006/0182119 A1 * | 8/2006 | Li et al. ................... | 370/395.52 |
| 2007/0094412 A1 * | 4/2007 | Sollee .......................... | 709/245 |
| 2007/0104105 A1 * | 5/2007 | MeLampy et al. ........... | 370/235 |
| 2007/0115945 A1 * | 5/2007 | Gass et al. ................... | 370/356 |
| 2007/0133432 A1 * | 6/2007 | De Noia et al. .............. | 370/253 |
| 2007/0223383 A1 * | 9/2007 | Kamath et al. ............... | 370/236 |

OTHER PUBLICATIONS

About.com, QoS, Mar. 9, 2004, pp. 1-3, About, Inc. USA, http://compnetworking.about.com/library/glossary/bldef-qos.htm.
Schulzrinne, et al., RTP A Transport for Real-Time Applications, pp. 1-71, Precept Software, Inc., California, USA, http://www.freesoft.org/CIE/RFC/Orig/rfc1889.txt.

* cited by examiner

*Primary Examiner*—Steven H Nguyen
(74) *Attorney, Agent, or Firm*—Carmen Patti Law Group, LLC (57) ABSTRACT

A maintenance component of an apparatus in one example employs one or more packets that are communicated over an active packet connection to evaluate the active packet connection.

30 Claims, 4 Drawing Sheets

TRANSMISSION OF MAINTENANCE INFORMATION OF AN ACTIVE PACKET CONNECTION THROUGH EMPLOYMENT OF PACKETS COMMUNICATED OVER THE ACTIVE PACKET CONNECTION

TECHNICAL FIELD

The invention relates generally to monitoring a network and more particularly to monitoring traffic over the network.

BACKGROUND

RFC 1889 (http://www.faqs.org/rfcs/rfc1889.html) describes a real-time transport protocol ("RTP") that employs one or more voice/data packets to transmit voice/data between endpoints over a packet-switched network. The data comprises real-time characteristics, for example, interactive audio and/or video. RTP employs a Real-Time Control Protocol ("RTCP") to monitor performance of and/or test transmission of the voice/data packets over the packet-switched network. RTCP employs one or more maintenance packets to provide for the monitoring of the voice/data packets. The endpoints establish a first connection over the packet-switched network. The endpoints transmit the voice/data packets over the first connection. The endpoints establish a second connection over the packet-switched network. The endpoints transmit the maintenance packets over the second connection to monitor the voice/data packets over the first connection. The transmission of maintenance packets over the second connection increases an amount of network traffic over the packet-switched network. As the amount of network traffic increases, performance of the network degrades. As one shortcoming, the maintenance packets issued onto the network to monitor the voice/data packets affect the performance of the voice/data packets.

Therefore, a need exists to monitor performance of and/or test the transmission of voice/data packets on a network without altering performance of the voice/data packets.

SUMMARY

The invention in one implementation encompasses an apparatus. The apparatus comprises a maintenance component that employs one or more packets that are communicated over an active packet connection to evaluate the active packet connection.

Another implementation of the invention encompasses a method. Maintenance information of an active packet connection is transmitted within one or more packets that are communicated over the active packet connection.

DESCRIPTION OF THE DRAWINGS

Features of exemplary implementations of the invention will become apparent from the description, the claims, and the accompanying drawings in which:

DETAILED DESCRIPTION

Figure 1:
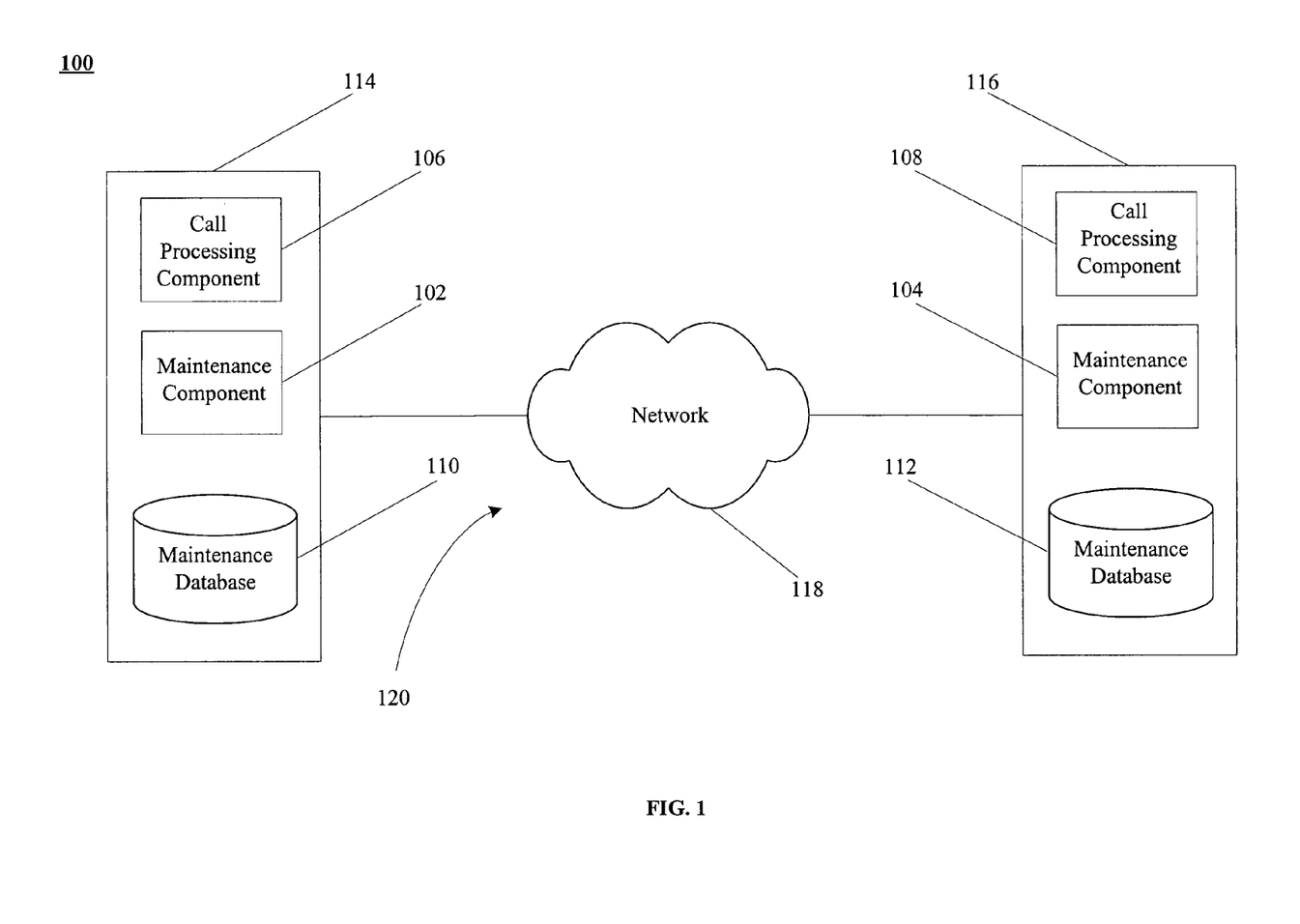
FIG. 1 is a representation of one or more maintenance components 102 and 104, one or more call processing components 106 and 108, one or more maintenance databases 110 and 112, one or more network elements 114 and 116, and one or more networks 118.

Turning to FIG. 1, an apparatus 100 in one example comprises one or more maintenance components 102 and 104, one or more call processing components 106 and 108, one or more maintenance databases 110 and 112, one or more network elements 114 and 116, and one or more networks 118. The call processing components 106 and 108 communicate one or more packets, for example, one or more voice/data packets, over an active packet connection 120 established between the network elements 114 and 116. The active packet connection 120 comprises one or more portions of one or more routes for one or more voice/data packets of a call between the network element 114 and the network 118, one or more portions of one or more routes for the one or more voice/data packets of the call over the network 118, and one or more portions of one or more routes for the one or more voice/data packets of the call between the network 118 and the network element 116. The call processing components 106 and 108 in one example employ the voice/data packets to send and/or receive data that comprises interactive audio and/or video, and maintenance information of the active packet connection 120. The maintenance information in one example comprises information associated with the active packet connection 120. The maintenance databases 110 and 112 store the maintenance information for the active packet connection 120 as obtained from a perspective of the maintenance components 102 and 104. The maintenance components 102 and/or 104 cooperate with the call processing components 106 and/or 108 to process the voice/data packets that are communicated over the active packet connection 120.

The network elements 114 and 116 comprise one or more gateways and/or switches. The network element 114 in one example comprises the maintenance component 102, the call processing component 106, and the maintenance database 110. The network element 116 in one example comprises the maintenance component 104, the call processing component 108, and the maintenance database 112. The network elements 114 and/or 116 comprise one or more endpoints for a call established over the network 118. The network elements 114 and 116 communicate over the active packet connection 120 for the call established over the network 118. The network elements 114 and 116 are uniquely identified on the network 118 by one or more Internet Protocol addresses ("IP" addresses). The network 118 comprises a packet-switched network.

The maintenance components 102 and/or 104 employ one or more voice/data packets that are communicated over the active packet connection 120 to request and/or receive maintenance information of the active packet connection 120 from an endpoint of the active packet connection 120. For example, the maintenance component 102 employs an outgoing voice/data packet for a call that is communicated over the active packet connection 120 to insert a request for the maintenance information of the active packet connection 120 from the network element 116. The outgoing voice/data packet for the call that contains the request for the maintenance information of the active packet connection 120 in one example comprises a request packet. The maintenance component 104 employs an outgoing voice/data packet for a call that is communicated over the active packet connection 120 to insert a response for the maintenance information of the active packet connection 120 to the network element 114. The outgoing voice/data packet for the call that contains the response for the maintenance information of the active packet connection 120 in one example comprises a response packet.

The maintenance components 102 and/or 104 cooperate with the call processing components 106 and/or 108, respectively, to insert, append, or prepend a request and/or response to the voice/data packets. In one example, the maintenance component 102 cooperates with the call processing component 106 to insert one or more octets of a request for maintenance information of the active packet connection 120 into a voice/data packet (e.g., a request packet) that is communicated over the active packet connection 120. The call processing component 106 inserts the octets of the request for the maintenance information of the active packet connection 120 into one or more unused fields of the voice/data packet. The call processing component 106 sets a bit in a header of the voice/data packet to indicate that the voice/data packet contains the request for the maintenance information of the active packet connection 120.

In another example, the maintenance component 104 cooperates with the call processing component 108 to append one or more octets of a response for maintenance information of the active packet connection 120 to a voice/data packet (e.g., a response packet) that is communicated over the active packet connection 120. The call processing component 108 sets a bit in a header of the voice/data packet to indicate that the voice/data packet contains the response for the maintenance information of the active packet connection 120. In yet another example, the maintenance component 104 cooperates with the call processing component 108 to prepend one or more octets of a response for maintenance information of the active packet connection 120 to a voice/data packet that is communicated over the active packet connection 120. The call processing component 108 sets a bit in a header of the voice/data packet to indicate that the voice/data packet contains the response for the maintenance information of the active packet connection 120, as will be appreciated by those skilled in the art.

Figure 2:
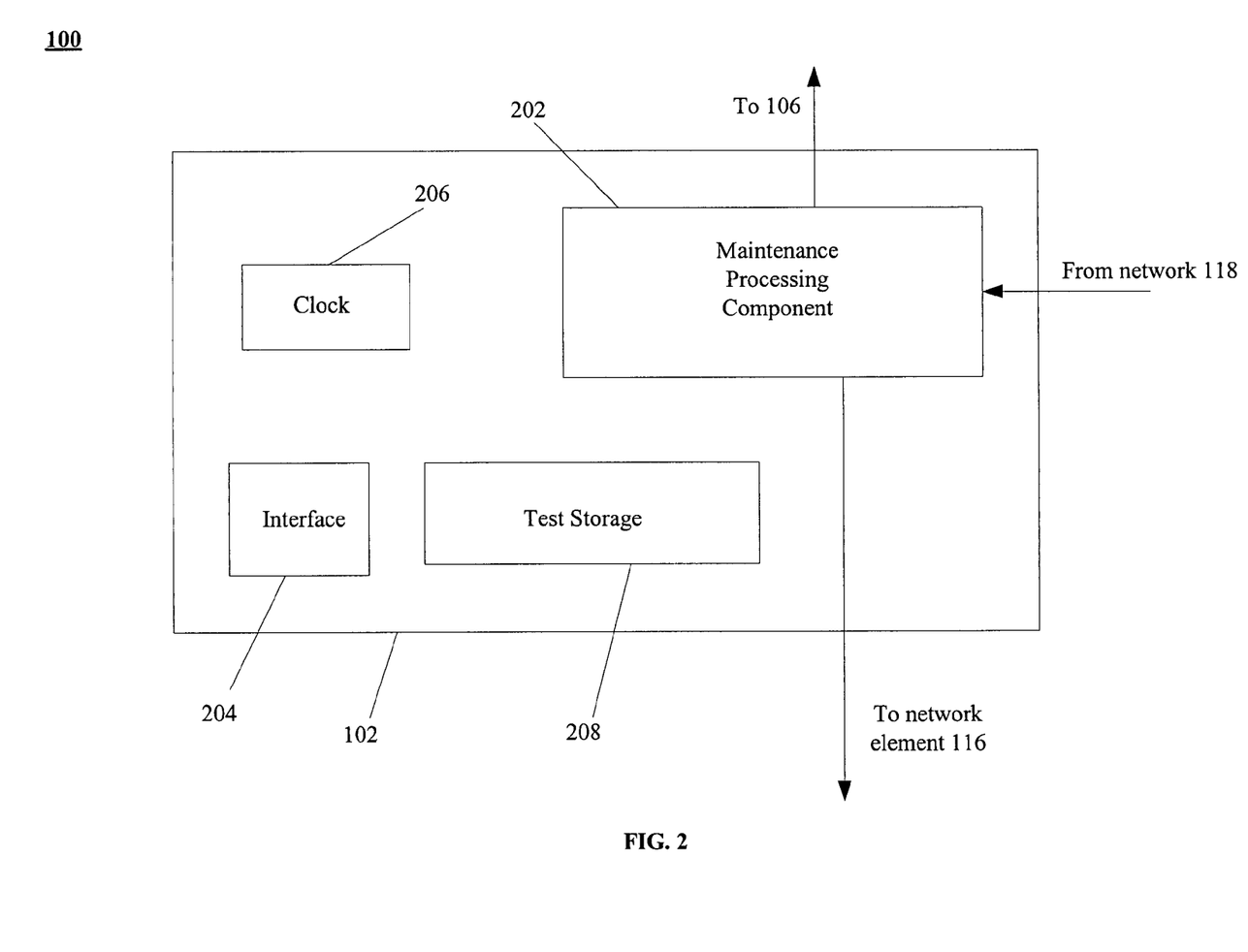
FIG. 2 is a representation of one or more maintenance processing components 202, one or more interfaces 204, one or more clocks 206, and one or more recordable data storage mediums 208 of the maintenance components 102 and/or 104 of the apparatus of FIG. 1.

Turning to FIG. 2, the maintenance components 102 and/or 104 in one example comprises one or more maintenance processing components 202, one or more interfaces 204, one or more clocks 206, and one or more recordable data storage mediums 208, as will be described herein. The clock 206 of the network element 114 comprises a granularity of time, for example, milliseconds, nanoseconds, or picoseconds. The clock 206 of the network element 116 comprises the same granularity of time as the clock 206 of the network element 114. For example, the clock 206 of the network element 114 and the clock 206 of the network element 116 comprise a granularity of time of milliseconds.

In one example, the maintenance processing component 202 processes maintenance information of the active packet connection 120. In another example, the maintenance processing component 202 generates a request for maintenance information of the active packet connection 120. In yet another example, the maintenance processing component 202 generates a response for maintenance information of the active packet connection 120. The maintenance processing component 202 employs one or more identifiers to associate a request for maintenance information of the active packet connection 120 with a response for the maintenance information of the active packet connection 120, as will be appreciated by those skilled in the art.

In one example, the maintenance processing component 202 allows for a generation of one or more requests for maintenance information of the active packet connection 120 through employment of the interface 204. The interface 204 allows a user, for example, a network administrator, to generate one or more requests for maintenance information of the active packet connection 120. In another example, the maintenance processing component 202 allows for provisioning of one or more thresholds associated with generation of the one or more requests for maintenance information of the active packet connection 120. The recordable data storage medium 208 stores one or more tests, for example, round-trip latency, number of dropped packets, and error rate.

The maintenance processing component 202 makes one or more determinations to generate one or more requests for maintenance information of the active packet connection 120. In one example, the maintenance processing component 202 in one example makes a determination to generate a request for maintenance information of the active packet connection 120 based on one or more thresholds or network conditions. In one example, the maintenance processing component 202 generates the request for maintenance information of the active packet connection 120 when a voice/data packet loss rate has exceeded a threshold for the active packet connection 120. In another example, the maintenance processing component 202 makes a determination to generate a request for maintenance information of the active packet connection 120 when Quality of Service ("QoS") has declined for another active packet connection, as will be appreciated by those skilled in the art.

The maintenance processing component 202 generates one or more requests for maintenance information of the active packet connection 120 at any one or more points of time for the call. For example, the maintenance processing component 202 generates a request for maintenance information of the active packet connection 120 at the beginning of a call, in the middle of a call, or at the end of the call. In one example, the maintenance processing component 202 generates a request for maintenance information of the active packet connection 120 upon establishment of the active packet connection 120. In another example, the maintenance processing component 202 generates a request for maintenance information of the active packet connection 120 upon teardown of the active packet connection 120. In yet another example, the maintenance processing component 202 generates a request for maintenance information of the active packet connection 120 at one or more periodic points of time of the call.

The maintenance processing component 202 cooperates with the call processing components 106 and/or 108 to generate a response for the maintenance information of the active packet connection 120 through employment of a voice/data packet, for example, a response packet. In one example, in response to a request for maintenance information of the active packet connection 120, the maintenance processing component 202 communicates with the maintenance databases 110 and/or 112 to obtain the maintenance information for the active packet connection 120. The response for the maintenance information of the active packet connection 120 in one example comprises the information retrieved from the maintenance database 110. In another example, in response to a request for maintenance information of the active packet connection 120, the maintenance processing component 202 executes one or more tests on the active packet connection 120. For example, the maintenance processing component 202 employs a voice/data packet to execute a round-trip latency test for a voice/data packet between the network elements 114 and 116. The maintenance processing component 202 employs one or more results from the tests to formulate a response for the maintenance information of the active packet connection 120.

Upon receipt of a voice/data packet that contains a response for maintenance information of the active packet connection 120, for example, a response packet, the maintenance processing component 202 makes one or more evaluations of the active packet connection 120 based on the maintenance information of the active packet connection 120. The maintenance processing component 202 employs the maintenance information of the active packet connection 120 from a far endpoint of the active packet connection 120, for example, the network element 116, and maintenance information of the active packet connection 120 from a near endpoint of the active packet connection 120, for example, the network element 114, to make the evaluations. The maintenance components 102 and/or 104 employ the evaluations of the active packet connection 120 from the respective endpoints of the active packet connection 120 to determine the QoS of the active packet connection 120 based on the evaluations. The maintenance components 102 and/or 104 make one or more determinations to generate additional active packet connections between the network elements 114 and 116 based on the QoS of the active packet connection 120. For example, upon receipt of the maintenance information of the active packet connection 120 from the network element 116, the maintenance component 102 makes a determination to withhold establishment of a second active packet connection between the network elements 114 and 116.

An illustrative description of exemplary operation of the apparatus 100 is presented, for explanatory purposes.

Figure 3:
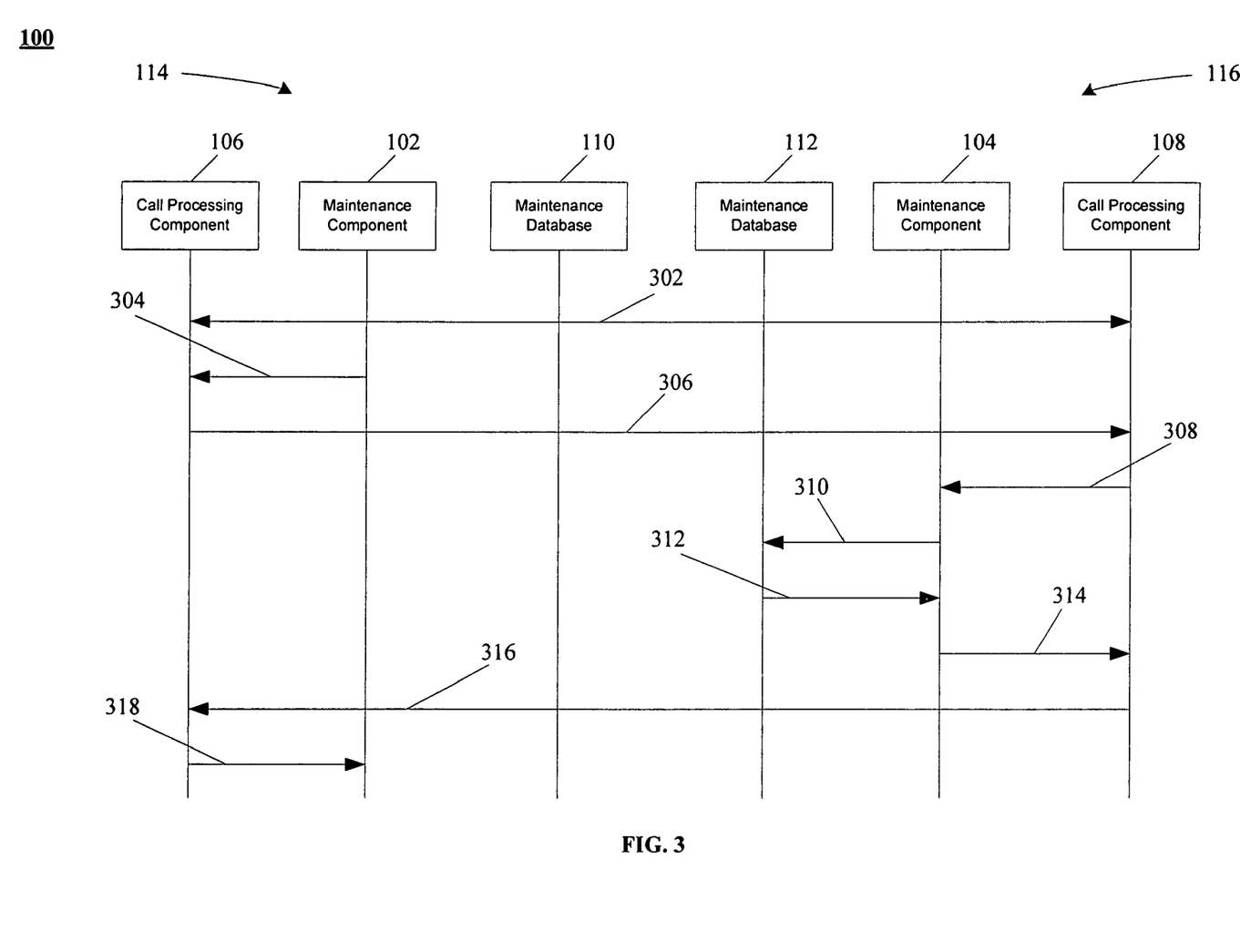
FIG. 3 is a representation of an exemplary process flow of a request and a response for maintenance information of an active packet connection between the network elements 114 and 116 of the apparatus of FIG. 1.

Turning to FIG. 3, the call processing components 106 and 108 of the network elements 114 and 116 cooperate to establish the active packet connection 120 for a voice call. In STEP 302, the call processing components 106 and 108 communicate a plurality of voice packets over the active packet connection 120 for the voice call. The maintenance component 102 makes a determination to monitor the active packet connection 120. In STEP 304, the maintenance component 102 provides to the call processing component 106, a request for maintenance information of the active packet connection 120 from the network element 116. The maintenance component 102 also provides an identifier for the request for the maintenance information of the active packet connection 120 to the call processing component 106. The call processing component 106 inserts the request for the maintenance information of the active packet connection 120 and the identifier into a voice packet of a plurality of voice packets that are communicated over the active packet connection 120 for the call. The call processing component 106 sets a bit in a header of the voice packet to mark the voice packet as a request packet. The call processing component 106 communicates the request packet to the network element 116 over the active packet connection 120, in STEP 306.

The call processing component 108 receives the request packet that is communicated over the active packet connection 120 from the network element 114. The call processing component 108 processes the header and determines that the voice packet contains the request for the maintenance information of the active packet connection 120. In STEP 308, the call processing component 108 sends the request for the maintenance information of the active packet connection 120 to the maintenance component 104. In STEP 310, the maintenance component 104 requests the maintenance information from the maintenance database 112. In STEP 312, the maintenance component 104 receives the maintenance information from the maintenance database 112. The maintenance component 104 provides a response for the maintenance information of the active packet connection 120 to the call processing component 108. In STEP 314, the call processing component 108 inserts the response for the maintenance information of the active packet connection 120 and the identifier into a voice packet of the plurality of voice packets that are communicated over the active packet connection 120 for the call. The call processing component 106 sets a bit in a header of the voice packet to mark the voice packet as a response packet. In STEP 316, the call processing component 108 communicates the response packet to the network element 114 over the active packet connection 120.

The call processing component 106 receives the response packet from the network element 116. In STEP 318, the call processing component 106 provides the response for the maintenance information of the active packet connection 120 and the identifier to the maintenance component 102. The maintenance component 102 evaluates the active packet connection 120 based on the response for the maintenance information of the active packet connection 120.

Figure 4:
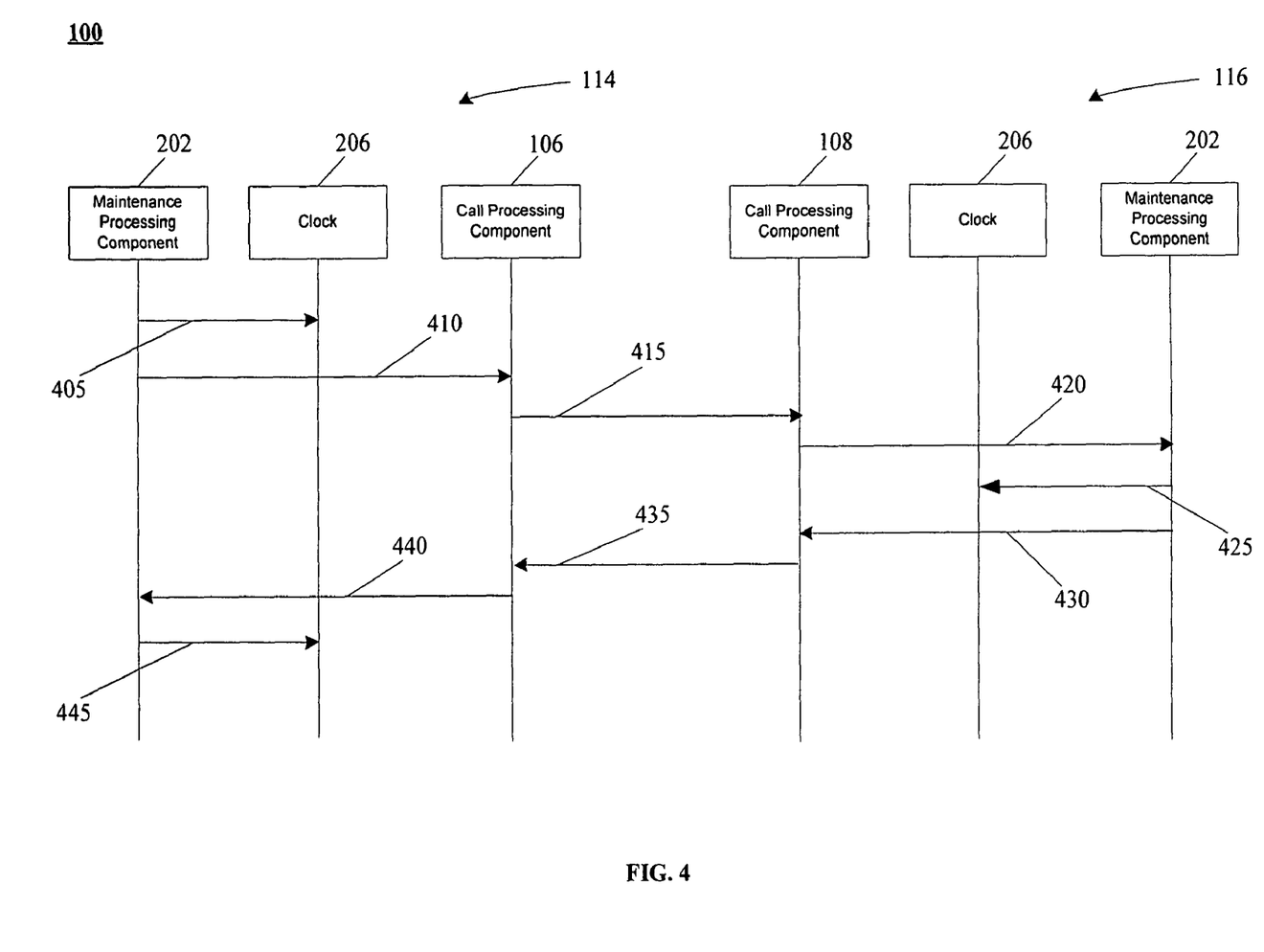
FIG. 4 is a representation of an exemplary process flow of execution of a test of the active packet connection between the network element 114 and the network element 116 of the apparatus of FIG. 1.

Turning to FIGS. 2 and 4, the maintenance processing component 202 of the network element 114 employs a voice/data packet to execute a round-trip latency test for a voice/data packet between the network element 114 and the network element 116. The clock 206 of the network element 114 comprises a granularity of time in milliseconds. The clock 206 of the network element 116 comprises the same granularity of time as the clock 206 of the network element 114. The clock 206 of the network element 114 is not synchronized with the clock 206 of the network element 116.

In STEP 405, the maintenance processing component 202 of the network element 114 obtains an initial timestamp based on the clock 206 of the network element 114, for example 125 milliseconds. In STEP 410, the maintenance processing component 202 of the network element 114 cooperates with the call processing component 106 to insert the initial timestamp into a voice/data packet that contains a request to initiate a test of the active packet connection 120. The call processing component 106 marks the voice/data packet as a request packet by setting a bit in a header of the voice/data packet. In STEP 415, the call processing component 106 sends the request packet to the network element 116.

The call processing component 108 receives the request packet over the active packet connection 120 from the network element 114. In STEP 420, the call processing component 108 sends the request packet to the maintenance processing component 202 of the network element 116. The maintenance processing component 202 of the network element 116 processes the request to test the active packet connection 120. In STEP 425, the maintenance processing component 202 of the network element 116 determines a queuing delay for the request packet based on the clock 206 of the network element 116, for example, 20 milliseconds. In STEP 430, the maintenance processing component 202 of the network element 116 cooperates with the call processing component 108 to insert the initial timestamp and the queuing delay into a voice/data packet that contains a response for the maintenance information of the active packet connection 120. The call processing component 108 marks the voice/data packet as a response packet by setting a bit in the header of the voice/data packet. In STEP 435, the call processing component 108 sends the response packet of the active packet connection 120 to the network element 114.

The call processing component 106 receives the response packet from the network element 116. In STEP 440, the call processing component 106 sends the response packet to the maintenance processing component 202 of the network element 114. In STEP 445, the maintenance processing component 202 of the network element 114 obtains a final timestamp based on the clock 206 of the network element 114, for example, 225 milliseconds. The maintenance processing component 202 of the network element 114 subtracts the initial timestamp and the queuing delay from the final timestamp value to determine the round-trip latency of a voice/data packet that is communicated over the active packet connection 120. The maintenance processing component 202 of the network element 114 determines that the round-trip latency of a voice/data packet due to the network is 80 milliseconds.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer readable media. Examples of a computer-readable medium for the apparatus 100 comprise the recordable data storage mediums 208 of the maintenance components 102 and 104. For example, the computer-readable medium for the apparatus 100 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a maintenance component configured to run on a gateway or a switch, the maintenance component having a maintenance processing component operable to generate requests for maintenance information and a storage medium operable to store tests, the maintenance component being operable to employ one or more packets that are communicated over an active packet connection to evaluate the active packet connection based on maintenance information of the active packet connection and to evaluate the active packet connection to determine a quality of service (QoS) of the active packet connection;
wherein the maintenance processing component is operable to employ the maintenance information from a far endpoint and a near endpoint of the active packet connection to make the evaluation; and
wherein the maintenance processing component is operable to generate a request for the maintenance information of the active packet connection at any one or more points of time for a call; and
wherein the maintenance processing component is operable to receive at least one response packet containing an indication of a queuing delay for the request; and
wherein the maintenance component is operable to monitor the active packet connection and execute one or more tests on the active packet connection.

2. The apparatus of claim 1, wherein the maintenance component is operable to employ employs one or more of the one or more packets that are communicated over the active packet connection to generate one or more requests for the maintenance information of the active packet connection.

3. The apparatus of claim 2, wherein the maintenance processing component is operable to make a determination to generate the one or more requests for the maintenance information of the active packet connection.

4. The apparatus of claim 2, wherein the maintenance component is operable to allow an initiation of the one or more request for the maintenance information of the active packet connection.

5. The apparatus of claim 2, wherein the one or more of the one or more packets that are communicated over the active packet connection comprise one or more request packets of the one or more packets that are communicated over the active packet connection; and
wherein the maintenance component is operable to receive one or more responses for the maintenance information of the active packet connection through employment of one or more response packets of the one or more packets that are communicated over the active packet connection.

6. The apparatus of claim 5, wherein the maintenance component is operable to perform an evaluation of the active packet connection based on the one or more responses for the maintenance information of the active packet connection.

7. The apparatus of claim 6, wherein the maintenance component is operable to store the evaluation of the active packet connection in a maintenance database.

8. The apparatus of claim 6, wherein the active packet connection comprises a first active packet connection, and wherein the maintenance component is operable to make a determination to establish a second active packet connection based on the evaluation of the first active packet connection.

9. The apparatus of claim 1, wherein the maintenance component is operable to cooperate with a call processing component to generate the one or more packets over the active packet connection, the call processing component being operable to send and receive data that comprises interactive audio and/or video.

10. The apparatus of claim 9, wherein the maintenance component is operable to cooperate with the call processing component to employ one or more octets of the maintenance information to one or more of the one or more packets that are communicated over the active packet connection.

11. The apparatus of claim 9, wherein the maintenance component is operable to cooperate with the call processing component to insert one or more octets of the maintenance information into one or more of the one or more packets that are communicated over the active packet connection.

12. The apparatus of claim 9, wherein the maintenance component is operable to cooperate with the call processing component to obtain the maintenance information of the active packet connection from within one or more of the one or more packets that are communicated over the active packet connection.

13. The apparatus of claim 1, wherein the maintenance component comprises a first maintenance component, and wherein the first maintenance component and a second maintenance component are operable to communicate through employment of the one or more packets that are communicated over the active packet connection; and     wherein the first maintenance component comprises the maintenance information of the active packet connection as obtained from a perspective of the first maintenance component; and     wherein the second maintenance component comprises the maintenance information of the active packet connection as obtained from a perspective of the second maintenance component; and     wherein the first maintenance component is operable to request the maintenance information of the active packet connection as obtained from the perspective of the second maintenance component from the second maintenance component through employment of one or more request packets of the one or more packets that are communicated over the active packet connection; and     wherein the second maintenance component is operable to provide the maintenance information of the active packet connection as obtained from the perspective of the second maintenance component to the first maintenance component through employment of one or more response packets of the one or more packets that are communicated over the active packet connection; and     wherein the first maintenance component is operable to perform an evaluation of the active packet connection based on the maintenance information of the active packet connection as obtained from a perspective of the first maintenance component and the maintenance information of the active packet connection as obtained from the perspective of the second maintenance component.

14. The apparatus of claim 1, wherein the maintenance component is operable to employ one or more of the one or more packets that are communicated over the active packet connection to generate one or more responses for the maintenance information of the active packet connection.

15. The apparatus of claim 14, wherein upon receipt of one or more request for the maintenance information, the maintenance component is operable to retrieve the maintenance information of the active packet connection from a maintenance database.

16. The apparatus of claim 14, wherein the maintenance component is operable to generate the one or more tests on the active packet connection; and     wherein the maintenance component is operable to receive the maintenance information of the active packet connection from one or more results of the one or more tests on the active packet connection.

17. The apparatus of claim 1, wherein one or more of the one or more packets comprise one or more identifiers, and wherein the maintenance component is operable to employ the one or more identifiers to match one or more requests for the maintenance information of the active packet connection with one or more responses for the maintenance information of the active packet connection.

18. The apparatus of claim 1, wherein the maintenance component is operable to generate a request for maintenance information of the active packet connection based on one or more network conditions.

19. The apparatus of claim 18, wherein the maintenance component is operable to generate the request for the maintenance information of the active packet connection when a voice/data packet loss rate has exceeded a threshold for the active packet connection.

20. The apparatus of claim 1, wherein the maintenance component is operable to generate a request for maintenance information of the active packet connection when the QoS has declined for another active packet connection.

21. The apparatus of claim 1, wherein the maintenance component is operable to generate a request for maintenance information of the active packet connection upon establishment of the active packet connection.

22. The apparatus of claim 1, wherein the maintenance component is operable to generate a request for maintenance information of the active packet connection upon teardown of the active packet connection.

23. The apparatus of claim 1, wherein the maintenance component is operable to generate a request for maintenance information of the active packet connection at one or more periodic points of time of the call.

24. The apparatus of claim 1, wherein the maintenance component is operable to employ the one or more packets to execute a round-trip latency test of a voice/data packet communicated over the active packet connection.

25. The apparatus of claim 1, wherein the maintenance component is operable to cooperate with a call processing component to insert an initial timestamp into a voice/data packet that contains a request to initiate a test of the active packet connection.

26. The apparatus of claim 1, wherein the maintenance processing component is operable to generate the requests for the maintenance information of the active packet connection through employment of an interface usable by a network administrator.

27. A method, comprising the steps of:

transmitting maintenance information of an active packet connection within one or more packets that are communicated over the active packet connection, wherein the maintenance information includes an indication of a queuing delay for a received packet that requested the maintenance information;

employing the maintenance information from a far endpoint and a near endpoint of the active packet connection to evaluate the active packet connection; and     employing an evaluation of the active packet connection to determine a quality of service (QoS) of the active packet connection;

wherein the maintenance information is transmitted to a maintenance component configured to run on a gateway or a switch, the maintenance component being operable to monitor the active packet connection and executes one or more tests on the active packet connection, and     wherein the maintenance component comprises a maintenance processing component operable to generate requests for the maintenance information and a storage medium that stores tests; and     wherein the maintenance processing component is operable to generate a request for the maintenance information of the active packet connection at any one or more points of time for the call.

28. The method of claim 27, wherein the step of transmitting the maintenance information of the active packet connection within the one or more packets that are communicated over the active packet connection further comprises the steps of:

receiving one or more requests for the maintenance information of the active packet connection through employment of one or more request packets of the one or more packets that are communicated over the active packet connection;

obtaining the maintenance information of the active packet connection; and transmitting one or more responses for the maintenance information of the active packet connection within one or more response packets of the one or more packets that are communicated over the active packet connection.

29. The method of claim 28, wherein the active packet connection comprises a first active packet connection, and wherein the step of transmitting the one or more responses for the maintenance information of the active packet connection within the one or more response packets of the one or more packets that are communicated over the first active packet connection further comprises the steps of:

obtaining the one or more responses for the maintenance information from within the one or more response packets of the one or more packets that are communicated over the first active packet connection;

performing one or more evaluations of the first active packet connection based on the one or more responses for the maintenance information; and     making one or more determinations to establish a second active packet connection based on the one or more evaluations.

30. An apparatus, comprising:

a maintenance component configured to run on a gateway or a switch, the maintenance component having a maintenance processing component operable to generate requests for maintenance information and a storage medium operable to store tests, the maintenance component being operable to employ one or more packets that are communicated over an active packet connection to evaluate the active packet connection based on maintenance information of the active packet connection and to evaluate the active packet connection to determine a quality of service (QoS) of the active packet connection, wherein the maintenance processing component is operable to employ the maintenance information from a far endpoint and a near endpoint of the active packet connection to make the evaluation, and wherein the maintenance processing component is operable to receive at least one packet containing an indication of a queuing delay in response to a request for the maintenance information.

\* \* \* \* \*